Sept. 19, 1967     A. N. DEDRICKS ETAL     3,342,040
APPARATUS FOR MAKING FROZEN PRODUCTS
Filed May 25, 1966     3 Sheets-Sheet 1
FIG. 1
FIG. 2
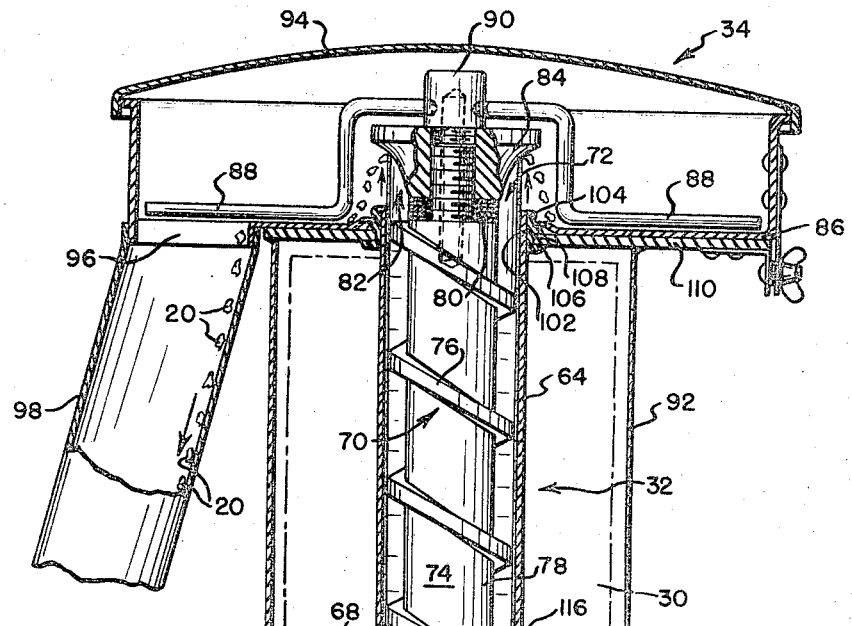
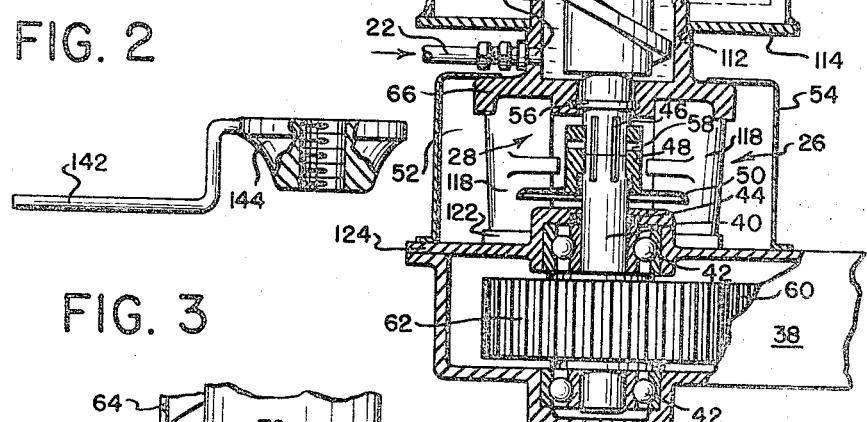
FIG. 3
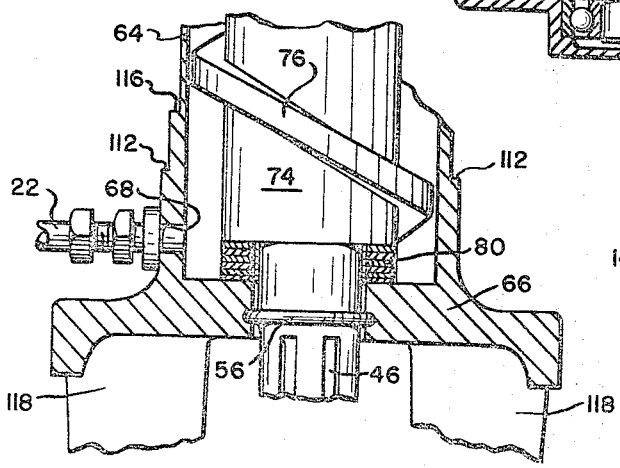
FIG. 4
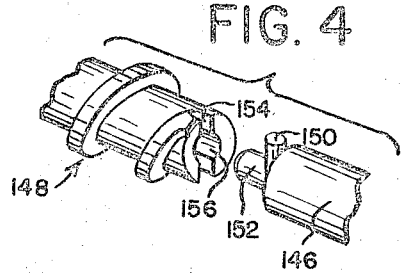
INVENTORS
ALVIN N. DEDRICKS
RICHARD H. SWANSON
BY
ATTORNEY

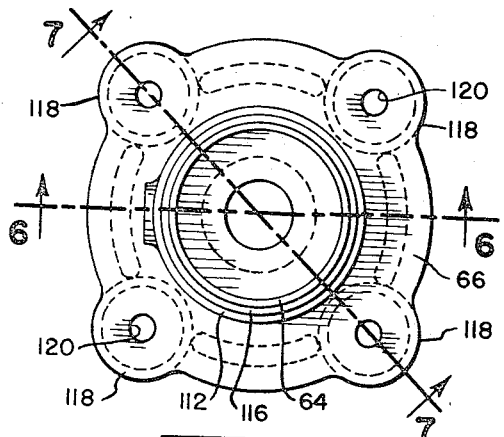
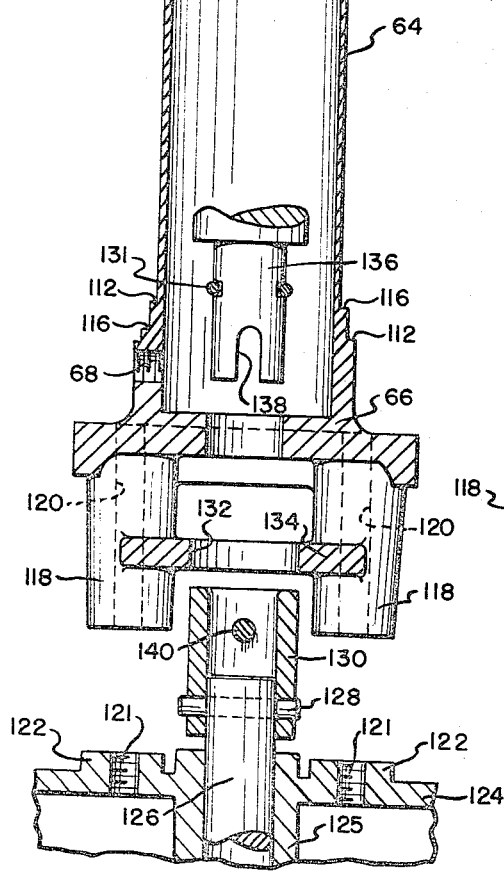
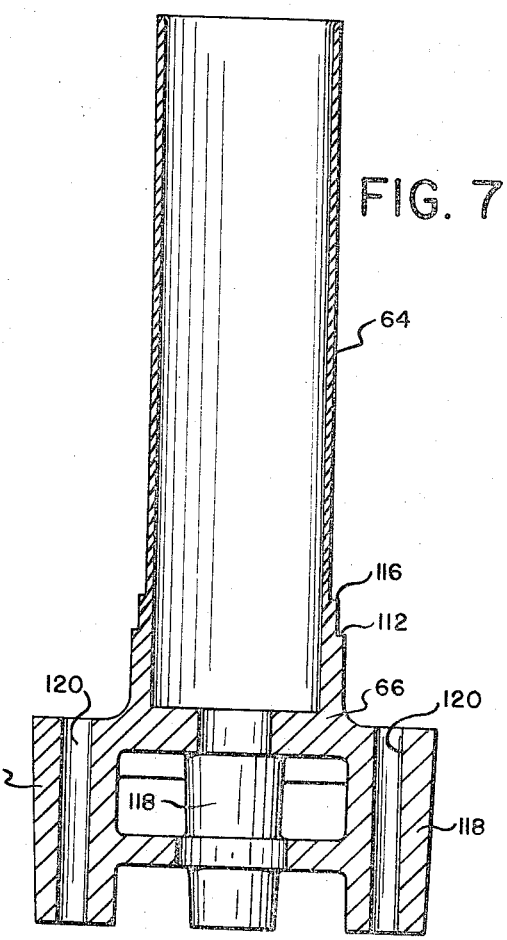

Sept. 19, 1967  A. N. DEDRICKS ET AL  3,342,040
APPARATUS FOR MAKING FROZEN PRODUCTS
Filed May 25, 1966  3 Sheets-Sheet 3
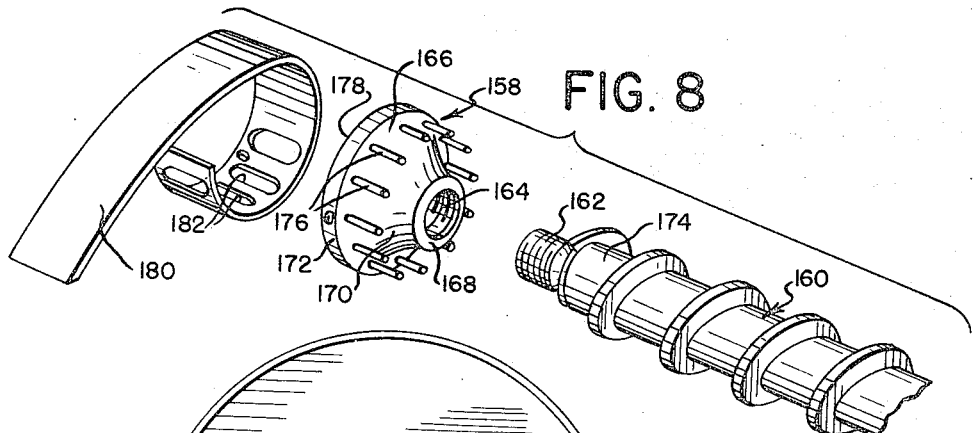
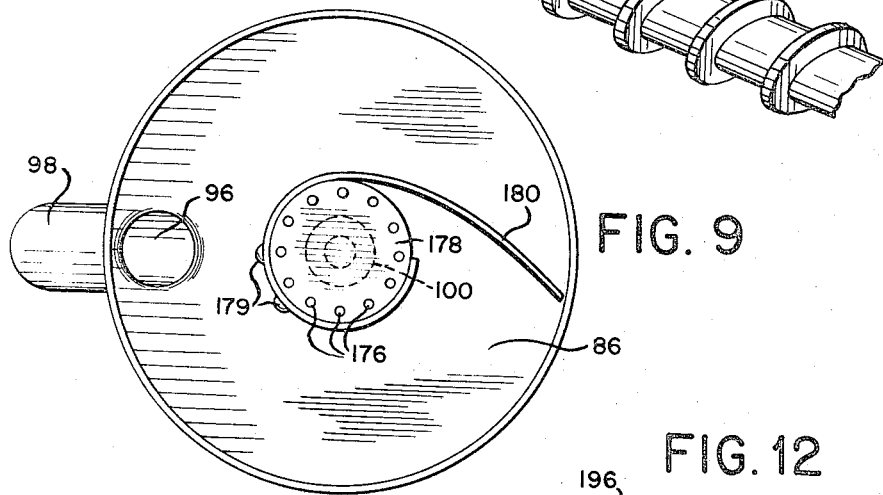
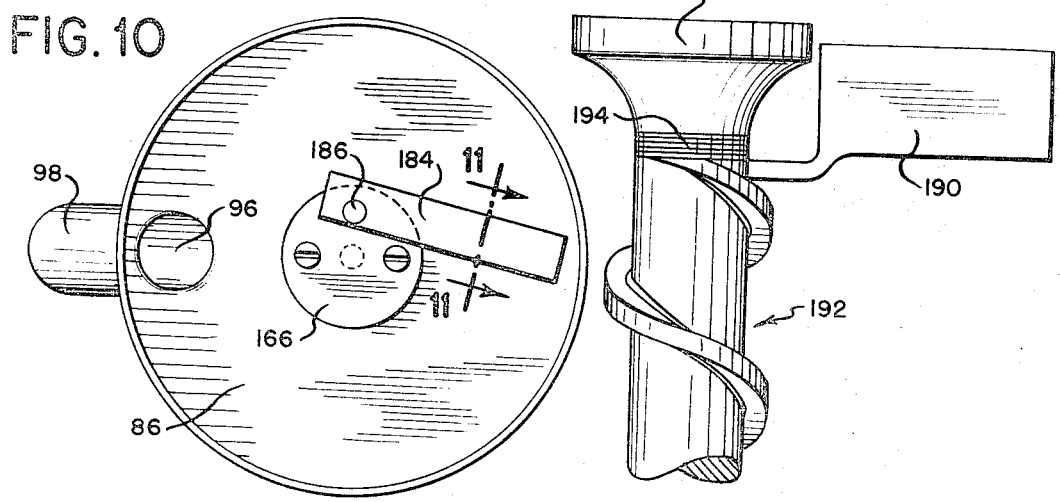
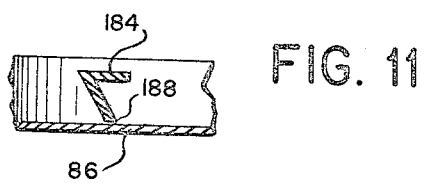
INVENTORS
ALVIN N. DEDRICKS
RICHARD H. SWANSON
BY
ATTORNEY

United States Patent Office

3,342,040
Patented Sept. 19, 1967

3,342,040
APPARATUS FOR MAKING FROZEN PRODUCTS
Alvin N. Dedricks and Richard H. Swanson, Manitowoc, Wis., assignors to The Manitowoc Company, Inc., Manitowoc, Wis., a corporation of Wisconsin
Filed May 25, 1966, Ser. No. 552,776
6 Claims. (Cl. 62—320)

ABSTRACT OF THE DISCLOSURE

This disclosure relates to the device for making frozen products in which the liquid material is conveyed through a central sleeve surrounded by a cooling medium so that the liquid material is actually frozen by the time it exits from the central sleeve. A suitable driving mechanism is provided beneath the central sleeve for driving the conveyor and propelling the liquid material through the central sleeve. A breaker arrangement is mounted above the outlet of the central sleeve and is arranged to break the frozen product exiting therefrom into pieces of suitable size.

---

This application is continuation-in-part of applicants' co-pending application, Ser. No. 291,101, filed June 27, 1963, and entitled, "Apparatus for Making Frozen Products," now U.S. Patent No. 3,256,710.

The present invention pertains, generally, to machinery, mechanism, equipment or apparatus particularly adapted to be utilized within a system employing a method or process for the preparation of frozen products and, more particularly, is concerned with the preparation of frozen foods.

The National Sanitation Foundation has formulated standards of cleanliness pertaining to automatic apparatus for preparing frozen food products. The manufacturers of such products must conform to these standards if they are desirous of obtaining a seal of approval from the foundation. These standards include definitions of the meaning of various requirements, of which the following are exemplary:

READILY ACCESSIBLE: Readily accessible shall mean exposed or easily exposed without the use of tools for proper and thorough cleaning and visual inspection;

ACCESSIBLE: Accessible shall mean readily exposed for proper and thorough cleaning and inspection with the use of only simple tools, such as a screwdriver, pliers, open-end wrench, or the like;

READILY (or easily) REMOVABLE: Readily (or easily) removable shall mean capable of being taken away from the main unit without the use of tools; and REMOVABLE: Removable shall mean capable of being taken away from the main unit with the use of only simple tools, such as a screwdriver, pliers, open-end wrench, or the like.

Having in mind the foregoing, it is therefore a primary object of the present invention to provide apparatus that is particularly adapted to be utilized within a system that employs a process or method for preparing frozen food products, said apparatus comprising an assembly or structure for breaking, dissolving, dispersing and separating the frozen food products into particles or chips that are then delivered to a storage area for use by a consumer, said apparatus and the system within which it is adapted to be utilized for performing the process or method conforming to the standards of the National Sanitation Foundation.

Another primary object of this invention is to provide apparatus particularly adapted to be utilized in a system employing a method or process for preparing frozen food products comprising an assembly or structure for breaking, dissolving, dispersing or separating the products into particles or chips, said apparatus being constructed and arranged to be capable of varying the size of the particles or chips.

Yet another primary object of this invention, in addition to the foregoing objects, is to provide apparatus particularly adapted to be utilized within a system that employs a method or process for preparing frozen food products, said apparatus comprising an assembly or structure for breaking, dissolving, dispersing or separating said frozen food products into particles or chips, said structure or assembly being rotatably positioned upon a conveyor arrangement, enabling the assembly or structure for breaking, dissolving, dispersing or separating the frozen food products into particles or chips to be removed and disassembled into component parts by hand without requiring the use of tools, implements, and the like.

It is a further primary object of this invention, in addition to the foregoing objects, to provide an assembly or structure for breaking, dissolving, dispersing or separating frozen food products into particles or chips comprising an auger-type ice chipping assembly or structure that is constructed and arranged to be adjustable by hand enabling wet or dry particles or chips of different sizes to be formed.

It is a still further primary object of the present invention, in addition to the foregoing objects, to provide an assembly or structure for breaking, dissolving, dispersing or separating frozen food products into particles or chips, said assembly or structure comprising a readily accessible and easily removable auger-type ice chipping unit having a rotatable collector assembly enabling the particles or chips to be removed and translated to a storage area.

It is also a primary object of this invention, in addition to the foregoing objects, to provide an assembly or structure for breaking, dissolving, dispersing, or separating frozen food products into relatively small particles or chips that may vary in size according to the needs of the consumer, said assembly or structure being constructed and arranged to compress the frozen product and effectively remove therefrom any unfrozen liquid.

Other objects, advantages and important features of the present invention will be apparent from a study of the specification following taken with the drawing which together describe, disclose, illustrate and show embodiments or modifications of an apparatus particularly adapted to be utilized within a system employing a method or process for preparing frozen products, and what is now considered and believed to be the best method of practicing the principles thereof. Still other embodiments, modifications, procedures or equivalents may be apparent to those having the benefit of the teachings herein, and such other embodiments, modifications, procedures or equivalents are intended to be reserved especially as they fall within the scope and breadth of the sub-joined claims.

In the drawing:

FIG. 1 is a side elevational view of machinery, mechanism, equipment or apparatus comprising the component parts of a system for forming frozen products of particle or chip size, wherein certain portions thereof are broken away and illustrated in section to better show the details of certain of the component parts;

FIG. 2 is an enlarged fragmentary view, partly in section, illustrating a modification of one of the component parts shown in FIG. 1, namely a sweep arm, wherein the arm is affixed to a head of a particle chip forming device;

FIG. 3 is a sectional view of one of the component parts shown in FIG. 1, namely an auger but illustrating a different location for an adjustment that is also shown in that figure as being at the bottom of the auger;

FIG. 4 is a fragmentary exploded view of a modified drive connection for the auger shown in FIG. 1;

FIG. 5 is a plan view of a freezer cylinder and the supporting structure therefor as illustrated in FIG. 1;

FIG. 6 is a sectional view taken substantially along the line 6—6 in FIG. 5, and illustrating another embodiment or modified of a drive connection for the auger shown in FIG. 1;

FIG. 7 is a sectional view taken substantially along the line 7—7 of FIG. 5;

FIG. 8 is an exploded perspective view of one end of the conveyor arrangement illustrated in FIG. 1, and also showing a modified particle chip forming device and sweep member;

FIG. 9 is a plan view of the particle chip forming device and sweep member shown in FIG. 8, and illustrating in addition a collector tray or pan;

FIG. 10 is a plan view similar to FIG. 9, but illustrating another modified form of the sweep member;

FIG. 11 is a sectional view taken substantially along the line 11—11 of FIG. 10, and looking substantially in the direction of the arrows; and FIG. 12 is an enlarged fragmentary view in elevation showing yet another modified form of the sweep member.

With reference now to the drawing, and particularly to FIG. 1 thereof, there is illustrated therein a preferred system employing a method or process for forming particles, flakes of chips 20 of a frozen product from a liquid source or supply line 22. The system comprises suitable drive machinery (not shown), a drive connection 26, a sealing mechanism 28, a freezing unit 30, conveying apparatus 32, and a collector 34 for removing the frozen particles or chips 20, from whence they can be transferred to a storage area (not shown) hereinafter to be described in greater detail. Some of the elements or components of the apparatus of the invention are not illustrated herein. Additionally, it is not deemed necessary to provide a very detailed explanation of certain other elements, such as the freezing unit 30, the supply reservoir, and the like, since these elements or components are described, disclosed, shown and illustrated in the aforesaid copending application Ser. No. 291,101. Accordingly, if a detailed description and showing of such components or parts is desired, reference may be had thereto.

The drive machinery (not shown) comprises suitable driving means such as a conventional electric motor (also not shown), and the like. Supported within a supporting gear transmission housing 38 and extending therefrom is a vertical drive shaft 40 rotatably journalled by means of spaced anti-friction bearing means 42 that may be of any suitable and conventional construction. The bearing means 42 are located within the housing 38, the upper bearing means being particularly adapted to cooperate with sealing means 44. The drive shaft 40 preferably is splined at its connecting end in any suitable manner to enable the drive shaft to cooperate with a similarly splined lower end portion 46 of the conveyor apparatus or arrangement 32. This may be accomplished in any suitable manner, as through the medium of a female splined coupling 48, or the like. A drip shield or liquid deflector 50 is suitably affixed in any suitable and conventional manner to the splined coupling 48 in overlying relationship with respect to the upper bearing means 42. This shield, as is considered readily apparent, directs any liquid that flows past the sealing mechanism 28 away from the upper bearing means 42, and into a chamber 52 which is defined, at least in part, by a suitable enclosure 54. This enclosure is disposed in surrounding relationship with respect to the drip shield 50, and is positioned upon and affixed to the transmission housing 38 in co-axial relationship with respect to the drive shaft 40.

A suitable seal 56 is fixedly disposed just above the end of the splined lower end portion 46 of the conveyor apparatus 32 to prevent liquid from leaking into the splined coupling 48, and the upper bearing means 42. The seal 56 may be of any suitable and conventional construction, and for example, may take the form of a suitable resilient O-ring fabricated of a rubber-like material. Additionally, water drain holes 58 are provided in the splined coupling 58, enabling the escape of any liquid that leaks or flows past the O-ring 56, and finds its way into the splines.

Drive gearing 60 and driven gearing 62 are positioned within the confines of the transmission housing 38 for rotating the conveying apparatus 32. The drive gearing 60 is suitably powered or driven by an electric motor or the like (not shown) while the driven gearing 62 is fixed to the drive shaft 40 for rotation therewith.

The freezing unit 30 comprises an elongate substantially rigid open-end freezing cylinder or tubular column 64. The column 64 is provided with a substantially open and unobstructed passage extending generally throughout the entire longitudinal dimensional extent thereof. The column 64 is disposed in coaxial relationship with respect to the drive shaft 40 and terminates at a supporting base 66, the latter of which is best shown in FIGS. 5 and 7. It will be understood that the specific structural details of the freezing equipment or unit 30 does not form a part of the present invention, although it may be equipped with a suitable freezing coil (not shown). It may additionally comprise any suitable and conventional refrigerating means. The O-ring 56 is seated within correspondingly shaped grooves located in the supporting base 66, and the splined lower end portion 46 of the conveyor apparatus 32. The supporting base 66, at the lower end thereof, comprises an aperture 68 disposed above the sealing mechanism 28 to enable the liquid to be frozen to pass or fall into the freezing tubular 64 from the supply line 22.

The conveyor apparatus 32 is positioned within the confines defined by the passage through the freezing column 64, and comprises a generally vertically disposed elongated rotatably mounted conveyor arrangement 70. An assembly or structure 72 for breaking, dissolving, dispersing or separating the frozen product into particles, chips, or the like, is fixedly secured to the conveyor arrangement 70 for rotation therewith as a unit, and may comprise either a separate or integral component thereof.

The conveyor apparatus 70, which is described, disclosed, shown and illustrated in greater detail in applicant's aforesaid co-pending application, is constructed and arranged to define an auger having a shaft portion 74 and a helical threaded portion 76. The helical threaded portion is provided with a constant root diameter completely of the longitudinal dimensional extent thereof, to thus define a substantially cylindrical surface 78 having a constant root diameter. There will therefore be provided a sufficient compressive force to separate any liquid from the frozen solid product. The upper end portion of the conveyor arrangement 70 projects outwardly from the freezing unit 30, at which location the assembly or structure 72 is disposed. The assembly 72 is removably securely attached to the shaft portion 74 and preferably comprises an adjustment 80, which as illustrated may take the form of a plurality of spacer means or shims together with a chip breaker and sizing-head portion 82 of an endless concave shape having a substantially disclike generally cylindrical body 84. The diameter of the body 84 is slightly greater than the corresponding diameter of the freezing column 64, the depth of the body 84 in a vertical direction being slightly less than that of the collection tray-like element 86.

The size of the chip 20 depends on the position or height of the body 84 with respect to the discharge end of the freezer column 64 which may be varied by the use of adjustment shims 80. More than five or six shims will cause larger and wetter chips of the frozen product, whereas a smaller number of shims will generate a smaller and dryer frozen product.

A pair of sweep arm-like members 88 preferably are supported from the auger shaft 74 so as to be independent of the height adjustment of the body 84. The sweep arm-like members 88 may be secured to a stud 90 in any suitable manner, as through the medium of welding, and the stud, in turn, securely affixed to the shaft 74. If desired, spacers (not shown) may be utilized between the stud 90 and the body 84 to raise the height of the members 88 relative to the tray-like element 86. The sweep arm-like members are generally L-shaped, and fabricated of a suitable rod-like material. The sweep arm-like members 88 are particularly adapted to perform a function hereinafter to be described in greater detail, and are disposed within the circular relatively shallow collection tray-like element 86. This tray-like element 86 is suitably secured to the outer surface of the upper portion of the freezing column 64 and the cylindrical freezer housing 92. The tray-like element 86 may be provided with a removable cover 94, and a discharge opening 96 in the radially outer portion thereof. An elongated tube or chute 98 depends from the element 86 at the location of the discharge opening 96, and extends in a generally downwardly and substantially outwardly projecting relationship with respect thereto. The tube or chute 98 may lead to a storage area (not shown), wherein the frozen product may be placed for use by the consumer. Since the sweep arm-like members 88 rotate with the conveyor arrangement 70, they serve to move particles or chips of the frozen product in the collector 34 toward the discharge opening 96 therein, from which the chips 20 are received at the entrance of the tube or chute 98 for disposal to a suitable storage area.

As clearly illustrated in FIG. 1, the tray-like element 86 of the collector 34 comprises, in addition, an aperture 100 (clearly shown in FIG. 9) within which there may be disposed a sealing assembly or ring 102. This assembly or ring 102 seals the aperture 100 relative to the upper portion of the freezing column 64, and may be fabricated of any suitable and resilient material, such as rubber, or the like. The assembly or ring 102 comprises a first or upper annular bead 104 disposed adjacent the upper end of the freezing column 64, and a second or lower annular bead 106 which is spaced from and larger than the upper bead 104. The lower and larger bead 106 is provided with an annular groove 108 in which the inner portion of an upper plate 110 of the freezing housing 92 is removably mounted or snap-fitted.

The inner portion of the collection tray-like element 86 is snap-fitted into sealing engagement with the flexible and resilient ring 102 between the upper bead 104 and the lower bead 106 thereof. The ring 102, therefore, serves to anchor the inner portions of both the upper freezer housing plate 110 and the collector tray-like element 86. In addition, the assembly 102 seals the inner portion of the tray-like element 86 to prevent any leakage therefrom.

As best shown in FIGS. 5 and 7, the freezing tubular column 64 may be integrally formed with the supporting-base 66. The supporting base 66 is provided with a first annular ledge 112 upon which is removably supported the lower end or annular plate 114 of the freezer housing 92. The upper and lower plate portions 110 and 114 are suitably welded or otherwise rigidly secured to the main cylindrical body portion of the freezer housing 92 and the bottom portion of the freezing unit 30 rests on a second annular ledge 116 on the freezer column, as best shown in FIG. 1.

Referring again to FIGS. 5 and 7, the base 66 of the freezing column 64 is provided with four equally radially spaced and downwardly extending, generally cylindrical legs 118, each having a longitudinal bore 120 therethrough. Each of the legs 118 rests on a boss or pedestal 122 formed integral with a support housing 124 which in turn is suitably secured to the transmission housing 38. Mounting bolts (not shown) are received in the bores 120 and threaded into threaded bores 121 (shown in FIG. 6) in each of the pedestals 122 so as to rigidly retain the legs 118 and thus the freezer column 64 on the support housing 124.

In FIG. 6, a modified form of drive connection is illustrated. As shown therein, the support housing 124 is provided with an integral bearing 125 in which drive shaft 126 is rotatably mounted. The lower portion (not shown) of the drive shaft 126 is connected in any suitable manner to a gear train (not shown) and a drive mechanism (not shown) for rotatably driving the drive shaft 126. The gear train and drive mechanism of FIG. 1 can be employed with this modified form of connection.

The upper portion of the drive shaft 126 is provided with a transverse slot (not shown) in which there is removably received a pin 128 that is secured to and disposed in transverse relation to a generally cylindrical coupling member 130. The coupling member 130 is rotatably mounted within the central opening 132 of a bearing plate 134 which is rigidly mounted on or formed integral with the legs 118 of the freezer column 64 (see FIGS. 1 and 7 also). The shaft portion 136 of the conveyor arrangement extends downwardly into and is slidably received within the coupling member 130 and is disposed in sealing relationship with respect thereto in any suitable manner, as through the medium of an O-ring 131. The lower portion of the shaft 136 is provided with a downwardly opening transverse groove 138 wherein which is perpendicular to the transverse groove (not shown) in the drive shaft 126. Removably received within the groove 138 of the operating shaft 136 is a second pin 140 secured to the coupling member 130 and disposed in perpendicular relation to the first pin 128. It will be readily seen, therefore, that the rotation of the drive shaft 126 is transmitted by the pin 128 to the coupling member 130 and then by the pin 140 to the operating shaft 136 of the conveyor arrangement 70. The conveyor apparatus 32 thus is rotatably driven by a drive shaft through a drive assembly comprising component parts which are easily accessible and disassembled, as particularly shown in FIG. 6.

In FIG. 3, a modification of the apparatus of FIG. 1 is illustrated. In this construction, the shims 80 are disposed between the lower end of the shaft portion 74 of the conveyor arrangement 70 and the supporting base 66 rather than at the top portion thereof. In this embodiment, the control of the size and wetness of the chip particles are also determined by the number of shims 80 utilized. An arbitrary fixed number of shims produces a particular chip or flake size and a particular wetness. If more shims are added, larger and wetter chips are produced whereas the removal of some shims results in smaller and dryer chips.

FIG. 2 illustrates an alternate embodiment of the sweep arm-like member 88 shown in FIG. 1. As shown in FIG. 2, sweep member 142 is suitably secured or fastened in any conventional manner, such as by welding, directly to the upper end of the disc-like generally cylindrical body 144.

Another modified drive connection similar to the type shown in FIG. 6 is illustrated in FIG. 4. As shown therein, drive shaft 146 drives the conveyor arrangement 148 by means of a pin 150 secured to a central guide portion 152 suitably smaller in diameter than the diameter of the drive shaft 146. Suitable notches or channels 154 and a complementary mating portion 156 are, of course, provided in the lower end of the conveyor arrangement 148 for defining and establishing the drive connection between the drive shaft 146 and the conveyor arrangement 148, and for providing a clearance and alignment opening for the guide portion 152 of drive shaft 146. All of the drive connections or coupling arrangements or assemblies disclosed herein permits the conveyor arrangement to be readily drivingly connected to, powered, actuated or rotatably operated by the drive shaft of the apparatus, yet the elements thereof are easily and readily removable and clearly accessible in accordance with and in compliance with the various codes and standardized design requirements as formulated and as set forth by the National Sanitation Foundation.

FIGS. 8–12 illustrate an alternate particle chipper forming device with various sweep arm-like members. As best shown in FIGS. 8 and 9, this particle or chip forming device is similarly secured to the upper end portion of the conveyor arrangement 160, which as illustrated in FIG. 8 of the drawing, comprises a reduced externally threaded portion 162 which is received within an internally threaded bore 164. It will also be understood at this time that the particle or chip forming device 158 may be secured to the conveyor arrangement 160 by other conventional means such as keys, set screws, or the like, as well as having the device 158 formed integral with the main shaft portion of the conveyor arrangement 160.

The particular or chip forming device 158 comprises a chip breaker and sizing head portion which has a substantially disc-like generally cylindrical body 166 of a diameter slightly greater than the corresponding diameter of the freezing column 64 with the body 166 having a vertical depth slightly less than that of the collection tray-like element 86, the lower surface 168 of the body 166 being positioned, when assembled into the apparatus of FIG. 1, slightly above in spaced relationship to the bottom surface of the tray-like element 86.

Extending substantially continuously around the lower peripheral side edge portion of the body 166 there is provided an annular substantially endless concave frozen product deflector surface 170 which terminates in the bottom 168 and side surface portions 172 of the body 166. The intersection of the deflector surface 170 and the bottom surface 168 of the body 166 is substantially in axial alignment with the surface 174 of the shaft portion of the conveyor arrangement 160.

While the radius of the curvature of the deflector surface for each of the particle or chip forming devices disclosed herein may be varied within limits defined by the desires of an operator, such radius of curvature should be sufficiently large enough so that the intersection of the bottom surface 168 of the body 166 with the deflector surface 170 will be at a location which is not generally offset beyond a continuation of the substantially cylindrical surface 174 of the shaft portion of the conveyor arrangement 160.

The body 166 of the particle or chip forming device 158 may also be provided with a series of breaker pins 176 which are disposed thereon at circumferentially spaced locations adjacent to the outer peripheral side surface 172 of the body 166. The pins 176 project into the cavity defined by the concave deflector 170 whereat the pins 176 terminate with the diameter measured from diametrically opposed pins being greater than the diameter defined by the surface created by the threaded portion of the conveyor arrangement 160, as well as the diameter of the freezing column 64. The breaker pins 176 have the upper end portions thereof flush with the top surface 178 of the body 166 and, as illustrated, are substantially equally disposed along spaced intervals around the body 166. However, it is to be understood that the breaker pins 176 may be secured to the body 166 at unequal spaced intervals and are removable and insertable into the body 166 so that the operator may vary, as desired or required, the size of the particles or chips which are created by the device 158.

Secured by suitable means 179, such as screws, or the like, to the side surface 172 of the body 166, for rotation therewith, in a generally wrapped-around relationship relative thereto is an alternate form of the sweep-arm like member. This sweep member 180, as best shown in FIGS. 8 and 9, has a vertical or upstanding depth which corresponds to and is substantially equal to the depth of the tray-like element 86. Additionally, the sweep member 180 closes a portion of the annular cavity defined by the deflector surface 170 at the area of circumferential extent which is adjacent the securement of the sweep member 180 to the body 166. Throughout the area of extent whereat the member 180 is secured to the body 166, the member 180 is provided with a series of apertures 182 through which the particles or chips 20 of the frozen product pass for engagement by the member 180 to urge the particles or chips 20 to be fed to the discharge opening 96 in the bottom of the tray-like element 86.

The area of extent along which the member 180 is secured to the body 166 places the member 180 in engagement with the body 166 for approximately 270° of the circumference of the body 166 (see FIG. 9 of the drawing), with the member 180 then extending substantially tangentially from the body 166 in a gentle, generally slightly arcuate sweep toward the peripheral extremity of the tray-like element 86, whereat the member 180 terminates in close proximity thereto.

In FIGS. 10 and 11 of the drawing, there is illustrated an embodiment or modification of the sweep arm-like member 180 which comprises an elongate substantially straight member 184 which is secured to the body by securing means 186 for rotation therewith. The elongate member 184 projects generally radially from the body 166 in a direction which may be considered as away from the direction which the body 166 of the particle or chip forming device 158 and conveyor arrangement 160 may be rotating. The member terminates in close proximity to the peripheral extent of the tray like element 86, and has an edge portion 188 thereof which projects forwardly in the direction of rotation and engages the bottom of the tray-like element 86, in a manner which is clearly illustrated in FIG. 11 of the drawing.

Another modification of the sweep arm-like member is illustrated in FIG. 12. As shown therein, the sweep arm-like member 190 is secured directly to the conveyor arrangement 192. If the shims 194 are positioned between the conveyor arrangement 192 and the body 196, the proper position of the member 190 relative to the tray-like element (not shown) will be maintained as the position of the body 196 and therefore the deflector surface 198 relative to the tray-like element is varied to change the size and wetness of the particles, chips, or the like.

The operation of the apparatus hereinbefore described particularly adapted to be utilized in a system that employs a method or process for preparing frozen products will now be described. The liquid to be frozen may be plain, flavored or colored, and may be of any suitable substance, such as water, fruit juice, or the like. The liquid continuously flows through the medium of the conduit 22 into the lower end portion of the freezing column 64. The liquid seeks a predetermined level in the tubular passage defined by the freezing column 64. The liquid in the freezer column 64 is progressively frozen through the medium of the freezing equipment or unit 30 as it progresses from the lower end portion towards the top portion thereof. The conveyor arrangement 70 is rotated at a predetermined rotational velocity enabling the frozen product to be progressively urged upwardly as it is being frozen. As the liquid product is being frozen within the confines of the freezing column 64, the frozen product takes solid form, adheres to and extends generally radially inwardly or laterally towards the conveyor arrangement 70 from the inner surface of the column 64, to and around the helical threaded portion 76, and against the surface 78 of the shaft portion 74. Thus, upon rotation of the conveyor arrangement 70, the helical threaded portion 76 will shear or cut through the frozen product and leave a film, layer, or column of frozen product which will correspond in size to the size of the clearance between the inner diameter of the freezing column 64, and the diameter of the helical threaded portion 76. A helical ribbon of frozen product is thus formed, and is forced and urged upwardly through the center opening in the tray-like element 86 of the collector 34.

As the ribbon of frozen product is forced or urged upwardly, it is brought into contact with the annular concave deflector surface portion 82 formed on the body 84 of the assembly or structure 72 for breaking, dissolving, dispersing or separating the frozen product into particles, chips, or the like; and, while simultaneously continuously lifting or urging the sheared or cut helical ribbon of frozen product upwardly to the particle or chip forming device, there is exerted a generally downwardly directed force that causes the conveyor arrangement to be maintained in operative relationship with the coupling means and drive connection. This surface or portion 82 deflects the ribbon of frozen products generally radially outwardly, thus effectively breaking, dissolving, dispersing or separating the frozen product into the particles or chips 20, or the like. At the same time, the deflector surface 82 squeezes or compresses the ice, thereby eliminating the free liquid therefrom. If a soft, wet product is desired, or a product is desired of which the particles or chips are a larger size, then an appropriate number of shims 80 may be utilized to vary the spacing between the annular concave deflector surface 82 and the tray-like element 86.

In the embodiment illustrated in FIGS. 8 and 9 of the drawings, the annular concave deflector surface 170 deflects the ribbon of frozen product generally radially outwardly and forces or urges the frozen product into contact with the rotating breaker pins 176. The pins aid or assist in breaking, dissolving, dispersing or separating the frozen product into the particles or chips 20, or the like, in conformity with the circumferential spacing of the breaker pins 176 about the body 166 of the assembly or structure 158. The size of the breaker pins may be varied, as may the circumferential spacing thereof. In this manner, it is possible to obtain particles, chips or the like which vary in size. Similarly, it is possible to vary the thickness of the ribbon of frozen product according to different size conveyor arrangements 160 wherein the shaft and helical threaded portions thereof are varied accordingly.

As the particles or chips 20, or the like, are being formed, they pass into the tray-like element 86 wherein they are engaged by the rotating member 88, 142, 180 or 184. This member directs the particles or chips 20 to the discharge opening 96 in the element 86, as which location the particles or chips pass through the elongated tube or chute 98 to the storage area (not shown). It should be noted that these members are each disposed relative to the rotating body of the particle or chip forming assembly or structure in such a manner as to cause the members to each of them urge the particles or chips 20 generally radially outwardly, and to effectively deflect the particles or chips passed the discharge opening in the tray-like element 86.

In accordance with the foregoing, it will now be understood that apparatus constructed in accordance with the principles of the present invention particularly adapted to be utilized in a system employing a method or process for preparing frozen products, and comprising an assembly or structure for breaking, disolving, dispersing or separating the frozen product into particles, chips, or the like is capable of a continuous operation, capable of forming frozen product chips, particles, or the like of varying sizes from suitable liquids, and capable of complying with the standards formulated by the National Sanitation Foundation.

In order to readily and easily assembly, dissassemble, remove and have the various component parts of the system hereinbefore described, disclosed, shown and illustrated otherwise accessible, primarily for the purpose of cleaning the component parts of the system by hand without requiring the aid of any tools, it is merely necessary to shut down the system which controls the freezing equipment or unit 30 that allows the liquid within the freezing column 64 to return to its liquid form as originally existed. The cover 94 of the tray-like element 86 of the collector 34 is removed, whence it is possible to manually grip the apparatus of structure 72 secured to the conveyor arrangement 70, and lift the apparatus 32 in an upward direction. This is accomplished with facility since the splined coupling 48 of the drive connection or the drive connection of FIGS. 4 and 6 are readily and easily uncoupled as a result of movement in this direction. Since the frozen product within the confines of the freezer column 64 has returned to its initial liquid state, the apparatus 32 is readily and easily accessible and removable from the system. Furthermore, when the apparatus 32 is removed, the remaining portions of the drive connection, as well as the freezing column 64 of the freezing equipment or unit 30, are easily and readily accessible for thorough cleaning in any suitable manner, as for example by scalding. The same is equally true with respect to the other components of the apparatus of this invention, such as the tray-like element 86, the discharge tube or chute 98, the members 88, 142, 180, 184, the body 84, 166 or 196 and the breaker pins, and such other components as those that define the drive connection, the sealing mechanism 7, the conveyor apparatus, the collector, the particle or chip forming assembly or structure, all of which may be easily, readily and thoroughly cleaned for sanitary purposes.

While the invention has been described and disclosed in terms of several embodiments or modifications which it has assumed in actual practice, the scope of the invention should not be deemed to be limited by the precise embodiments or modifications as herein shown, illustrated, described and disclosed, such other embodiments or modifications intended to be reserved especially as they fall within the scope of the claims here appended.

What is claimed is:

1. Apparatus for forming frozen particles of a predetermined size, said apparatus comprising:

a generally upwardly projecting freezer cylinder having an open upper end portion and a support base adjacent the lower end portion thereof, said freezer cylinder having a first annular ledge on the exterior surface disposed near the lower end portion thereof and a second annular ledge on the exterior surface thereof disposed above said first annular ledge;

a generally cylindrical freezer surrounding the freezer cylinder and being removably supported on the first annular ledge thereof;

a generally cylindrical freezer housing surrounding said freezer and having an annular bottom portion removably supported on said second annular ledge;

a conduit connected to the lower end portion of said freezer cylinder in comunication with the interior thereof to supply liquid to said freezer cylinder;

a rotary conveyor device disposed within said freezer cylinder;

said freezer cylinder having a supporting base provided with an opening therethrough for receiving an elongate shaft portion of the rotary conveyor device;

a transmission housing disposed beneath said supporting base in spaced relationship relative thereto and having a drive shaft rotatably mounted thereon and extending upwardly therefrom;

said supporting base having a plurality of depending leg-like portions formed thereon which are rigidly and removably connected to said transmission housing;

a bearing plate disposed beneath said supporting base and having an aperture therethrough with said bearing plate being connected to said depending leg-like portions;

a generally cylindrical, substantially upwardly extending coupling member rotatably mounted within but separated from said supporting base;

the lower end portion of said rotary conveyor shaft portion being slidably disposed within said coupling member and having sealing means thereabout for sealing said lower end portion to the supporting base;

the upper portion of said drive shaft being slidably disposed within said coupling member for enabling rotation of said drive shaft to be transferred to said coupling member and then from said coupling member to said rotary conveyor shaft portion;

said open upper end portion of said freezer cylinder extending generally upwardly beyond said freezer;

a collector tray-like structure surrounding the upper end portion of said freezer;

said collector tray-like structure having an exit area for receiving frozen particles;

a chipper device having a body portion removably mounted on the upper end portion of said rotary conveyor shaft portion;

said chipper device having a curved annular deflector surface defining a concave cavity;

said chipper device being adjustably mounted with respect to said collector tray with the curved annular deflector surface thereof being generally spaced above the tray-like structure; and a sweep device connected to said chipper device and extending generally outwardly therefrom into said tray-like structure for moving frozen particles to said exit area.

2. Apparatus for forming frozen particles comprising:

a generally upwardly projecting freezing compartment having a generally circular bore, an open upper end portion and a support base adjacent the lower end portion thereof, the freezing compartment having a first peripheral ledge on the exterior surface disposed near the lower end portion thereof and a second peripheral ledge on the exterior surface thereof disposed above the first peripheral ledge;

a freezing unit surrounding the freezing compartment and removably supported on the first peripheral ledge;

a freezer housing surrounding the freezing unit and having a bottom portion removably supported on the second peripheral ledge;

a conduit connected to the lower end portion of the freezing compartment in communication with the interior thereof to supply liquid thereto;

a rotary conveyor device disposed within the circular bore of the freezing compartment and having an elongated shaft portion;

the support base of the freezing compartment having an opening therethrough for receiving the elongate shaft portion of the rotary conveyor device;

a transmission, disposed beneath the supporting base in spaced relationship thereto and having a housing and a rotary drive shaft extending upwardly therefrom;

a coupling member drivably connecting the elongate shaft portion of the rotary conveyor device and the transmission drive shaft;

the upper end of the freezing compartment extending upwardly beyond the freezing unit;

a tray-like structure surrounding the upper end portion of the freezer and having an exit area for passing frozen particles to a remote location; and a chipper device having a body portion mounted on the upper end of the rotary conveyor.

3. The apparatus of claim 2 further comprising structure affixing the freezing compartment to the transmission housing.

4. The apparatus of claim 3 wherein the affixing structure comprises a plurality of leg-like portions integral with the support base of the freezing cylinder disposed about the coupling, and at least one securing device connecting one of the leg-like portions to the transmission housing.

5. The apparatus of claim 2 further comprising sealing structured disposed about the elongate shaft portion of the conveyor device and engaging the opening formed by the support base for maintaining liquid in the freezing compartment.

6. The apparatus of claim 2 further comprising a drip shield disposed about portions of the transmission drive shaft and having a flared lower end for diverting liquid drippage away from the lower end portion of the transmission drive shaft.

References Cited

UNITED STATES PATENTS

| | | | |
|---|---|---|---|
| 3,034,311 | 5/1962 | Nelson | 62—354 X |
| 3,034,317 | 5/1962 | Schneider et al. | 62—354 X |
| 3,059,450 | 10/1962 | Mueller et al. | 62—354 X |
| 3,126,719 | 3/1964 | Swatsick | 62—320 |
| 3,143,865 | 8/1964 | Ross | 62—354 |
| 3,159,986 | 12/1964 | King | 62—354 |
| 3,205,673 | 9/1965 | Soderberg | 62—71 |
| 3,245,225 | 4/1966 | Wallace | 62—320 |

WILLIAM J. WYE, *Primary Examiner.*

MEYER PERLIN, *Examiner.*

W. E. WAYNER, *Assistant Examiner.*